United States Patent [19]

Coppier

[11] Patent Number: 5,339,978
[45] Date of Patent: Aug. 23, 1994

[54] DEVICE FOR LOCKING THE COVER OF A KETTLE DURING POURING AND KETTLE COMPRISING SUCH A DEVICE

[75] Inventor: Michel Coppier, Eterey, France

[73] Assignee: Seb S.A., Selongey, France

[21] Appl. No.: 72,993

[22] Filed: Jun. 7, 1993

[30] Foreign Application Priority Data

Jun. 5, 1992 [FR] France ............... 92 06870

[51] Int. Cl.⁵ ............................. B65D 45/02
[52] U.S. Cl. ................... 220/318; 220/912
[58] Field of Search ........... 220/315, 318, 317, 912, 220/326; 222/566

[56] References Cited

U.S. PATENT DOCUMENTS 1,496,600  6/1924  Rau .
1,685,560  9/1928  Trulock ................. 220/318 X
1,819,037  8/1931  Raster .
1,837,198 12/1931  Boylan .
3,876,104  4/1975  Minsky et al. .

FOREIGN PATENT DOCUMENTS 12384 of 1914 United Kingdom .

Primary Examiner—Allan N. Shoap
Assistant Examiner—Nova Stucker
Attorney, Agent, or Firm—Young & Thompson

[57] ABSTRACT

A device for locking a cover of a kettle, the kettle being constituted by a pot (1), a removable cover (2) and a fixed handle (3). The device is a movable member disposed in the handle (3) and manually controlled, permitting maintaining the cover (2) closed and becoming inoperative at rest under the action of a return spring (6). The handle (3) has a recess (7) in which is disposed a pivotally mounted lever (4), comprising at one of its ends a portion (4a) that projects outside the recess (7) and is urged outwardly by the spring (6), and another end adapted to bear against the cover (2) to maintain it closed when the user presses manually on the projecting portion (4a) of the lever (4).

8 Claims, 1 Drawing Sheet

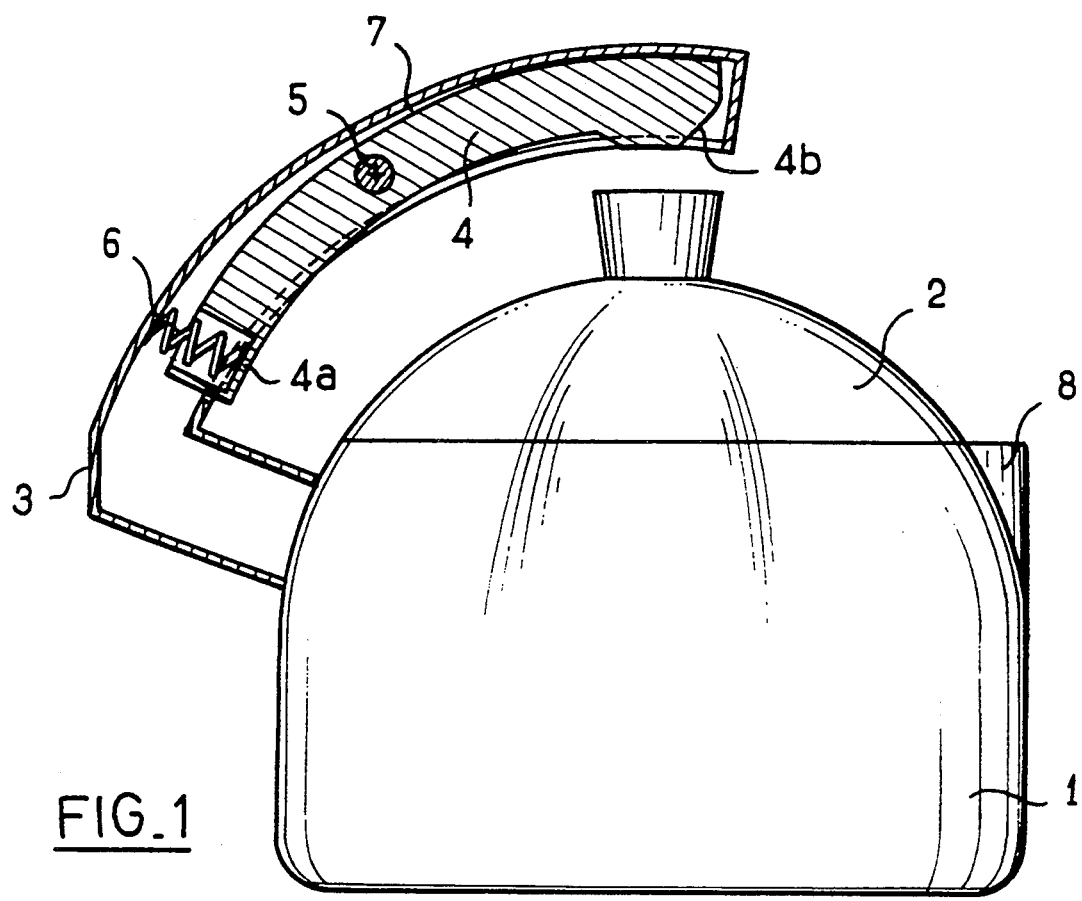
FIG._1
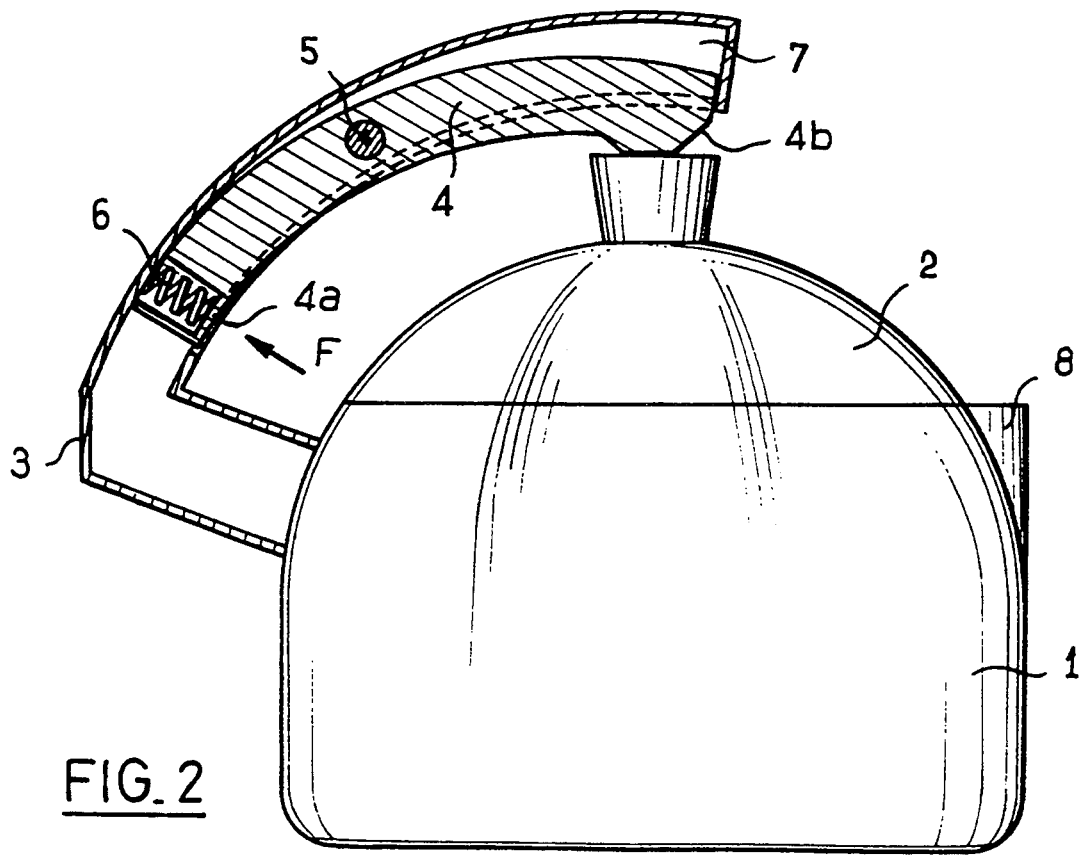
FIG._2

DEVICE FOR LOCKING THE COVER OF A KETTLE DURING POURING AND KETTLE COMPRISING SUCH A DEVICE

The present invention relates to a device for locking the cover of a kettle or the like, so as to avoid the cover falling when the kettle is inclined, particularly during pouring of its contents.

The invention particularly aims to provide a locking device which will be simple to make and not involving supplemental manipulation by the user.

A conventional kettle is constituted of a pot, a fixed handle and a removable cover. When the user, to serve the contents, grasps the kettle and tilts it, he must also maintain, with the help of his other hand, the cover on the pot. Apart from the possible fall of the cover if the utilizer does not prevent it, the conventional kettle occupies both hands of the user.

Solutions have been proposed to lock the cover when the kettle is inclined. Thus, U.S. Pat. No. 1,685,560 discloses a teapot comprising a pot, a pouring spout, a removable cover and a fixed handle surmounted by a pusher by the bias of which a transmission linkage is caused to pivot a retaining finger which bears on the edge of the cover. Such a device is complicated to make because it comprises multiple mechanical connections and requires the hollowing of the handle at several places, particularly to include the transmission linkage, retracting the retaining finger at rest and permitting the displacement of the pusher. Moreover, even if the position of the pusher above the handle can correspond to a position of the finger during grasping the handle, it is nevertheless possible to grasp the teapot in any other manner and thus to fail to actuate the locking device for the cover.

The principal object of the present invention is to provide a simpler structure to obtain a locking device of a cover of a receptacle, of the kettle type.

Another object of the invention is to permit the locking of the cover simultaneously with the grasping of the handle by the user.

According to the invention, the locking device for a cover of a kettle constituted by a pot, a removable cover and a fixed handle is characterized in that it comprises a pivoting lever, disposed in a recess in the handle, comprising at one of its ends a portion projecting from the recess and another end being adapted to bear against the cover to maintain it on the pot when the user presses manually on the projecting portion of the lever.

According to a preferred embodiment of the invention, the lever is mounted on a pivot axle which is integral with the handle and which is situated between the two ends of the lever.

The handle preferably comprises an end adjacent the projecting portion of the lever which is fixed to the pot of the kettle and an end adjacent the other portion of the lever which is located substantially above the highest point of the cover.

According to a particular embodiment of the device according to the invention, the handle is made of a tube which is hollowed in the region directed toward the cover. It preferably has an arcuate portion which extends substantially parallel to the convex surface of the cover. The lever preferably also has an arcuate shape whose radius of curvature is slightly less than that of the arcuate portion of the handle.

Thus, when the user grasps the handle, he also pushes on the projecting portion of the lever such that the other end will come to bear on the cover. The grasping of the handle and the locking of the cover are therefore simultaneous.

Preferably, a spring is interposed between the projecting portion of the lever and the bottom of the recess of the handle. The projecting portion preferably comprises a recess to receive the return spring.

Thus, when the user puts down the kettle and releases the handle, the spring pushes the end of the lever outside the recess of the handle.

Other characteristics and advantages of the invention will become apparent from the following description.

In the accompanying drawing, given by way of non-limiting example:

FIG. 1 is an elevational and partially cross-sectional view of a kettle provided with a device according to the invention, in its inactive position; and FIG. 2 is a view similar to FIG. 1, showing the device in its active position.

The kettle shown in FIG. 1 is constituted by a pot provided with a pouring spout 8 and a handle 3. A removable cover 2 closes the pot 1. The handle 3 is a tube having an arcuate portion substantially parallel to the convex portion of cover 2 and is fixed to the pot 1 by one of its ends, such that the other end is above and substantially in the middle of the cover 2. A handle 3 has a recess 7 in its arcuate portion, facing the kettle. A lever 4 is mounted on an axle of rotation 5, integral with the handle 3, within the recess 7. The lever 4 has an arcuate shape, whose radius of curvature is noticeably less than that of the arcuate shape of the handle 3.

The end 4a of lever 4 comprises a recess in which is disposed a spring 6 interposed between the end 4a and the bottom of the recess 7. The spring 6 is so chosen that at rest, it presses the end 4a outside the recess 7. The end 4b of lever 4 thus limits the movement of the lever 4 about the axle 5, coming into abutment with the bottom of the recess 7.

When the user grasps the kettle by the handle 3, he also acts on the end 4a of the lever (see the arrow F in FIG. 2) by pushing it inwardly of the recess 7 while compressing the spring 6, as shown in FIG. 2. The other end 4b of lever 4 is then moved outside the recess 7, to come to bear on the cover 2. When the user tilts the kettle, the cover 2 is thus retained by the end 4b of lever 4.

The device according to the invention thus permits the user very easily to block the cover 2 on the pot 1 of the kettle as soon as he grasps the handle 3, without supplemental manipulation.

Moreover, the positioning of the end 4a of the lever 4 in the handle 3 corresponds to the natural grasping of the handle 3 to pour. When the kettle is inclined, the hand which holds the handle 3 acts all the more easily on the end 4a of the lever 4, as the weight of the kettle contributes to reinforce the contact between the hand and the end 4a of the lever 4.

Of course, the present invention is not limited to the embodiment described above and numerous modifications can be made without departing from the scope of the invention.

The handle 3 could be shorter such that the lever 4 comes to bear on the edge of the cover 2 and not at the middle.

What is claimed is:

1. A kettle having a device for locking a cover of the kettle, the kettle comprising a pot (1), a removable cover (2) and a fixed handle (3), the device comprising a lever disposed in the handle (3) and manually movable between a first position maintaining the cover (2) closed and movable under the action of return means to a second position permitting the cover to open; wherein the handle (3) comprises a recess (7) in which said lever is pivotally mounted, said lever (4) comprising one end that projects outside the recess (7) in said second position and another end (4b) adapted to bear against the cover (2) in said first position to maintain said cover closed when the user presses manually on said one end (4a) of the lever (4).

2. Device according to claim 1, wherein a pivotal axle (5) of the lever (4) is integral with the handle (3) and is located between the two ends (4a, 4b) of the lever (4).

3. Device according to claim 1, wherein said one end (4a) is adjacent the pot (1) of the kettle and said another end (4b) is located substantially directly above the top of the cover (2).

4. Device according to claim 1, wherein the handle (3) has an arcuate portion which extends substantially parallel to a convex surface of the cover (2).

5. Device according to claim 1, wherein the handle (3) is a tube which is open in a region directed toward the cover (2).

6. Device according to claim 5, wherein the handle (3) has an arcuate portion and the lever (4) has an arcuate shape whose radius of curvature is slightly less than that of the arcuate portion of the handle (3).

7. Device according to claim 1, wherein the return means is a spring (6) interposed between said one end (4a) of the lever (4) and a bottom of the recess (7) of the handle (3).

8. Device according to claim 7, wherein said one end (4a) of the lever (4) comprises a recess receiving the return spring (6).

* * * * *